United States Patent [19]

Marchand

[11] Patent Number: 5,784,543
[45] Date of Patent: *Jul. 21, 1998

[54] CLOCK MULTIPLIER

[75] Inventor: J. F. Philippe Marchand, Rochester, N.Y.

[73] Assignee: Xerox Corporation, Stamford, Conn.

[*] Notice: The term of this patent shall not extend beyond the expiration date of Pat. No. 5,606,648.

[21] Appl. No.: 567,395

[22] Filed: Dec. 4, 1995

[51] Int. Cl.$^6$ ............................................. G06K 15/00
[52] U.S. Cl. .......................... 395/102; 395/109; 395/107
[58] Field of Search ............................ 395/102, 109, 395/107, 101; 358/447, 456, 458, 459, 429, 409, 410, 412, 298, 300; 382/299; 347/131, 254; 375/371, 373, 376; 371/1

[56] References Cited

U.S. PATENT DOCUMENTS

| | | | |
|---|---|---|---|
| 4,841,551 | 6/1989 | Avaneas | 375/373 |
| 4,908,842 | 3/1990 | Collins | 375/373 |
| 4,955,040 | 9/1990 | Sarkoezi | 375/373 |
| 5,022,057 | 6/1991 | Nishi et al. | 375/373 |
| 5,243,441 | 9/1993 | Kawata | 358/451 |
| 5,274,472 | 12/1993 | Williams | 358/429 |
| 5,387,985 | 2/1995 | Loce et al. | 358/447 |
| 5,495,341 | 2/1996 | Kawana et al. | 358/298 |
| 5,606,648 | 2/1997 | Walther et al. | 395/107 |

*Primary Examiner*—Edward L. Coles, Sr.
*Assistant Examiner*—Dov Popovici
*Attorney, Agent, or Firm*—Lloyd F. Bean, II

[57] ABSTRACT

The clock multiplier which is useful for multiplying the frequency of a clock signal by an integer factor, like 4 or 6. In a typical application this multiplier is used for achieving high addressability printing on a laser printer. In order to print at a quarter pixel resolution, the frequency of the clock signal must be multiplied by four. It is important that at the beginning of the pulse train, as occurs on the leading edge of each scanline, the new clock locks in at once with the input clock from the printer. The clock multiplier, as described below, has capabilities for multiplying the input clock by a factor of 4. Other factors, like 2, 6 or 8 can easily be achieved by expanding on the description. The circuit features automatic and instant locking to the input pulse train, as well as automatic tuning to the present clock frequency.

7 Claims, 7 Drawing Sheets

CLOCK MULTIPLIER

FIELD OF THE INVENTION

The invention relates generally to a clock multiplier and more specifically to a clock multiplier that enables high addressability in a laser printer by providing a signal at 2, 4, or 6 times the pixel clock frequency.

BACKGROUND OF THE INVENTION

Modern electronic printers are capable of producing quite complex and interesting page images The pages may include text, graphics, and scanned or computer-generated images. The image of a page is described as a collection of simple image components or primitives (characters, lines, bitmaps, colors). Complex pages can then be built by specifying a large number of the basic image primitives. This is done by a page description language such as PostScript. The job of the electronic printer's software is to receive, interpret and draw each of the imaging primitives for the page. The drawing, or rasterization must be done on an internal, electronic model of the page. All image components must be collected and the final page image must be assembled before marking can begin. This electronic model of the page is often constructed in a data structure called an image buffer. The data contained is in the form of an array of color values called pixels. Each pixel corresponds to a spot which can be marked on the actual page and the pixel's value gives the color which should be used when marking. The pixels are organized to reflect the geometric relation of their corresponding spots. They are usually ordered such as to provide easy access in the raster pattern required for marking.

In generating color pictorial images, a large number of colors and moderate spatial resolution are generally required to achieve a high-quality image. Because the eye can detect approximately 100 intensity levels, i.e., for three color separations, seven bits per color separation per pixel, imaging systems should support at least this number of intensity levels. Generally, however, imaging systems support 256 different intensity levels. The 256 intensity levels supported by an imaging system performing three color separations for a full-color image correspond to eight bits per color separation, i.e., twenty-four bits per pixel. Accordingly, for high-quality renditions of real-life scenes, an imaging system supporting at least 100 intensity levels detectable by the eye requires less than 200 pixels per inch to achieve an image having a sufficient level of spatial resolution.

When material such as textual material and synthetic graphic material is being imaged, the accuracy of color is not nearly so important to achieve a high-quality image, particularly since the color used is generally a constant black. High spatial resolution is, however, needed to provide images having crisp, clear edges.

A continuing goal in the art is to develop printers, with improved image quality. Physical constraints such as output terminal device resolution (spots per unit area) can be enhanced so as to increase perceived resolution without resorting to physical device resolution increases. Current technology improves device resolution without actually increasing dots per unit area. There are many advantages to increasing or controlling a printer's virtual (enhanced) resolution. The most evident advantage is a compatibility issue. Many printers have a physical resolution (or addressability) of 300 dots per inch (dpi), and by creating printers with greater physical resolutions such as 400 dpi, image emitters or document creators producing resolution dependent images at a particular resolution are no longer compatible. A solution to this problem is found by using device independent document (or image) descriptions such as Xerox Interpress and PostScript page description languages.

A further limitation of higher resolution devices is hardware affordability. Physical memory requirements increase when device resolution increases, directly increasing the cost of a physical device. As a result of increased memory requirements for higher resolution devices, technology enhancing physical device resolution limitations (virtual resolution) are desirable additions to the physical device.

High addressability techniques use laser modulation or pulse width modulation to increase printer resolution without modifying the physical printer device. Laser modulation uses a controller to modulate the appearance of the final output image. Printed spots of the output image may be moved, shrunk, or reshaped to achieve a variety of effects. High addressability methods affect the horizontal resolution. For example, doubling printer modulation rate results in doubling the horizontal resolution, while keeping vertical resolution unchanged. New and improved techniques to increase image resolution have improved halftone image quality. Specifically, in the field of digital halftoning, different methods of converting continuous tone to binary images while preserving the appearance of tonal gradation or density similar to the original image have been disclosed.

The following patent, the pertinent portions of which are incorporated herein by reference, discloses a method for transforming gray video input information, with an interpolation function, into a binary high addressability output representation for later manipulation on binary high addressability output terminals, such as printers and displays:

U.S. Pat. No. 5,274,472

Patentee: Williams

Issued: Dec. 28, 1993

In one approach to high addressability output printing, images are stored in the form of image data, the image data being represented by pixels. To increase horizontal resolution, each pixel is divided into M subpixels by a conventional enhancement technique. In turn, for purposes of printing the M subpixels, a modulator for a raster output scanner receives the M subpixels at a given clock rate and outputs a single bit stream to a raster output scanner (ROS), at a rate of N times greater than the given clock rate. It is believed that the increased clock rate is obtained by providing the modulator with two separate clocks, namely a first clock to "clock" the pixels into the modulator and a second clock to clock out the subpixels at the clock rate that is N times the given clock rate.

In the before-mentioned system it is desirable to ensure that the faster clock starts instantaneously with the first clock pulse after line-sync to preserve the symmetry of the clock signal so that all sub-pixels have the same width.

SUMMARY OF THE INVENTION

In accordance with the invention there is provided a printing system for printing an image on a substrate, the image being represented by a set of words with each word being modulated so as to produce a single bit stream, each of the words including M bits, including a tunable multiphase clock generator, responsive to a clock signal with a first clock rate, for producing N phase signals; a data serializer, communicating with said multi-phase clock generator, for receiving the N phase signals and the word set, said data serializer processing each word of the word set, with the N phase signals, to produce the single bit stream, the single bit stream being outputted at a second clock rate with the second clock rate being greater than the first clock rate; a tuning circuit, responsive to said tunable muti-phase clock, for controlling tuning of said tunable multi-phase clock generator so that said single bit stream being outputted with said second clock rate is outputted substantially instantaneously with reception of said clock signal; and a print engine communicating with said data serializer and receiving the single bit stream, said print engine printing the image on the substrate.

Pursuant to another aspect of the invention, there is provided a method for printing an image on a substrate, the image being represented by a set of words with each word being modulated so as to produce a single bit stream, each of the words including M bits, including the step of producing N phase signals with a tunable multi-phase clock generator, responsive to a clock signal with a first clock rate; receiving the N phase signals and the word set; processing each word of the word set, with the N phase signals, to produce the single bit stream, the single bit stream being outputted at a second clock rate with the second clock rate being greater than the first clock rate; tuning said tunable multi-phase clock generator so that said single bit stream being outputted with said second clock rate is outputted substantially instantaneously with reception of said clock signal; receiving the single bit stream; and printing the image on the substrate.

These and other aspects of the invention will become apparent from the following description used to illustrate a preferred embodiment of the invention read in conjunction with the accompanying drawings.

While the present invention is described primarily in connection with a preferred embodiment thereof, it will be understood that it is not intended to limit the invention to that embodiment. On the contrary, it is intended to cover all alternatives, modifications and equivalents as may be included within the spirit and scope of the invention as defined by the appended claims.

DESCRIPTION OF THE PREFERRED EMBODIMENT

Figure 7:
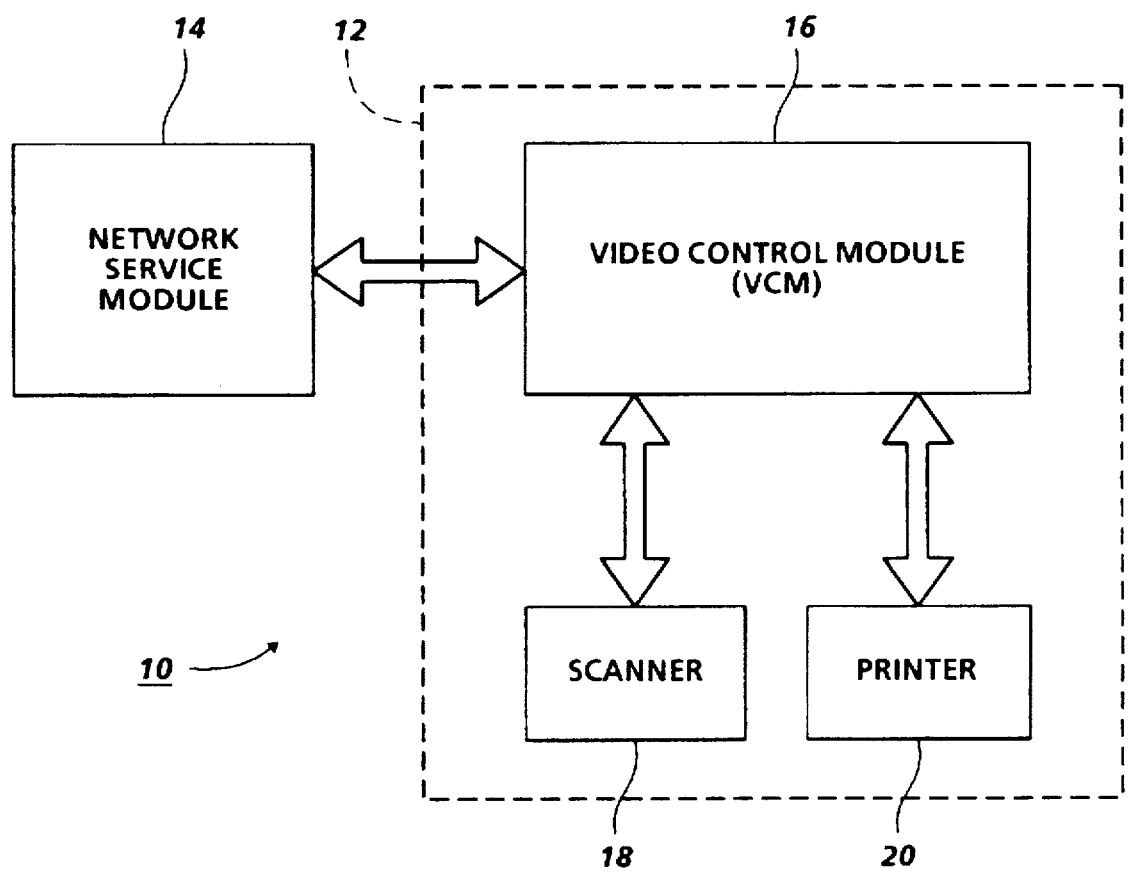
FIG. 7 is a block diagram depicting a multifunctional, network adaptive printing machine.

Referring to FIG. 7, a multifunctional, network adaptive printing system is designated by the numeral 10. The printing system 10 includes a printing machine 12 operatively coupled with a network service module 14. The printing machine 12 includes an electronic subsystem 16, referred to as a video control module (VCM), communicating with a scanner 18 and a printer 20. In one example, the VCM 16, which will be described in further detail below, coordinates the operation of the scanner and printer in a digital copying arrangement. In a digital copying arrangement, the scanner 18 (also referred to as image input terminal (IIT)) reads an image on an original document by using a CCD full width array and converts analog video signals, as gathered, into digital signals. In turn, an image processing system (not shown), associated with the scanner 18, executes signal correction and the like, converts the corrected signals into multi-level signals (e.g. binary signals), compresses the multi-level signals and preferably stores the same in electronic precollation (EPC) memory (not shown).

Referring again to FIG. 7, the printer 20 (also referred to as image output terminal (IOT)) preferably includes a xerographic print engine. In one example, the print engine has a multi-pitch belt (not shown) which is written on with an imaging source, such as a synchronous source (e.g. laser raster output scanning device) or an asynchronous source (e.g. LED print bar). In a printing context, the multi-level image data is read out of the EPC memory (not shown) while the imaging source is turned on and off, in accordance with the image data, forming a latent image on the photoreceptor. In turn, the latent image is developed with, for example, a hybrid jumping development technique and transferred to a print media sheet. Upon fusing the resulting print, it may be inverted for duplexing or simply outputted. It will be appreciated by those skilled in the art that the printer can assume other forms besides a xerographic print engine without altering the concept upon which the disclosed embodiment is based. For example, the printing system 10 could be implemented with a thermal ink jet or ionographic printer.

Figure 8A:
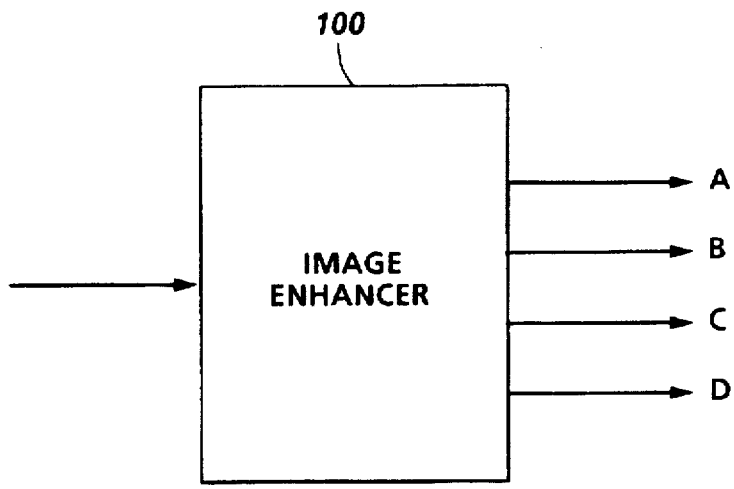
FIG. 8A is a block diagram of an apparatus for enhancing binary image data.

The printer 20 includes an image processing section for performing such operations as smoothing. Smoothing, among other operations can be achieved by enhancing image data stored in the EPC memory with an image enhancer 100. Preferably, the stored image data is represented by pixels and the image enhancer serves to divide each pixel into N subpixels. An approach for image enhancement is disclosed in U.S. Pat. No. 5,282,057 to Mailloux, the pertinent portions of which are incorporated herein by reference. While the image enhancer of FIG. 8A is shown as outputting four subpixels, the number of subpixels outputted could be more or less than four without affecting the concept upon which the disclosed embodiment is based.

Figure 8B:
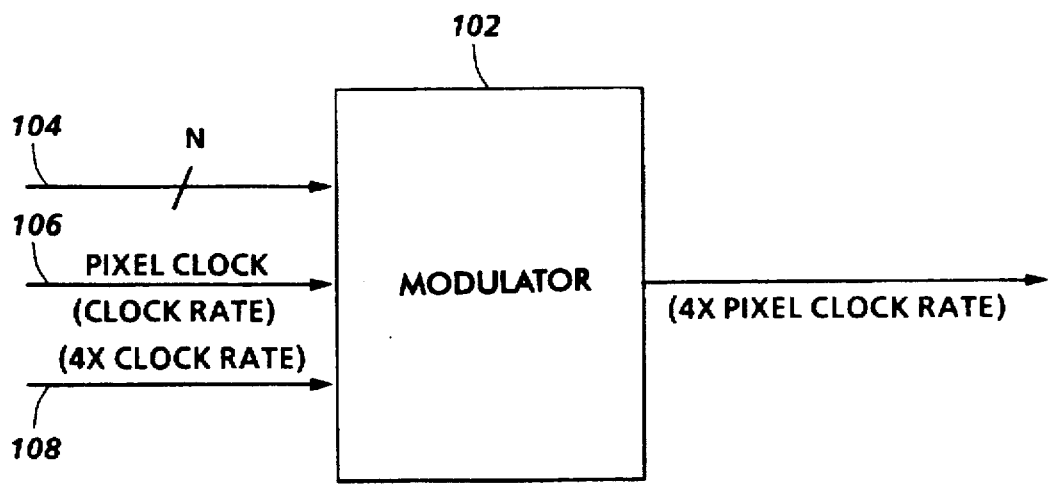
FIG. 8B is a block diagram of a high addressability modulator for modulating the enhanced image data produced by the image enhancer of FIG. 8A.

Referring to FIG. 8B, a technique, which is believed to be known, is discussed. A high addressability modulator 102 receives the subpixels of image enhancer 100 via line 104, the line 104 being adapted to receive N bits. Additionally, the modulator 102 receives clock inputs via lines 106 and 108. Preferably, the input of clock line 108 is N times greater than the input of clock line 106. In operation, the bits of line 104 are clocked in by the clock input of line 106 and the clocked-in subpixels, represented by bits, are serialized and clocked out, with the clock input of line 108, at a rate that is N times greater than the clock rate of the the clock input of line 106.

Figure 1:
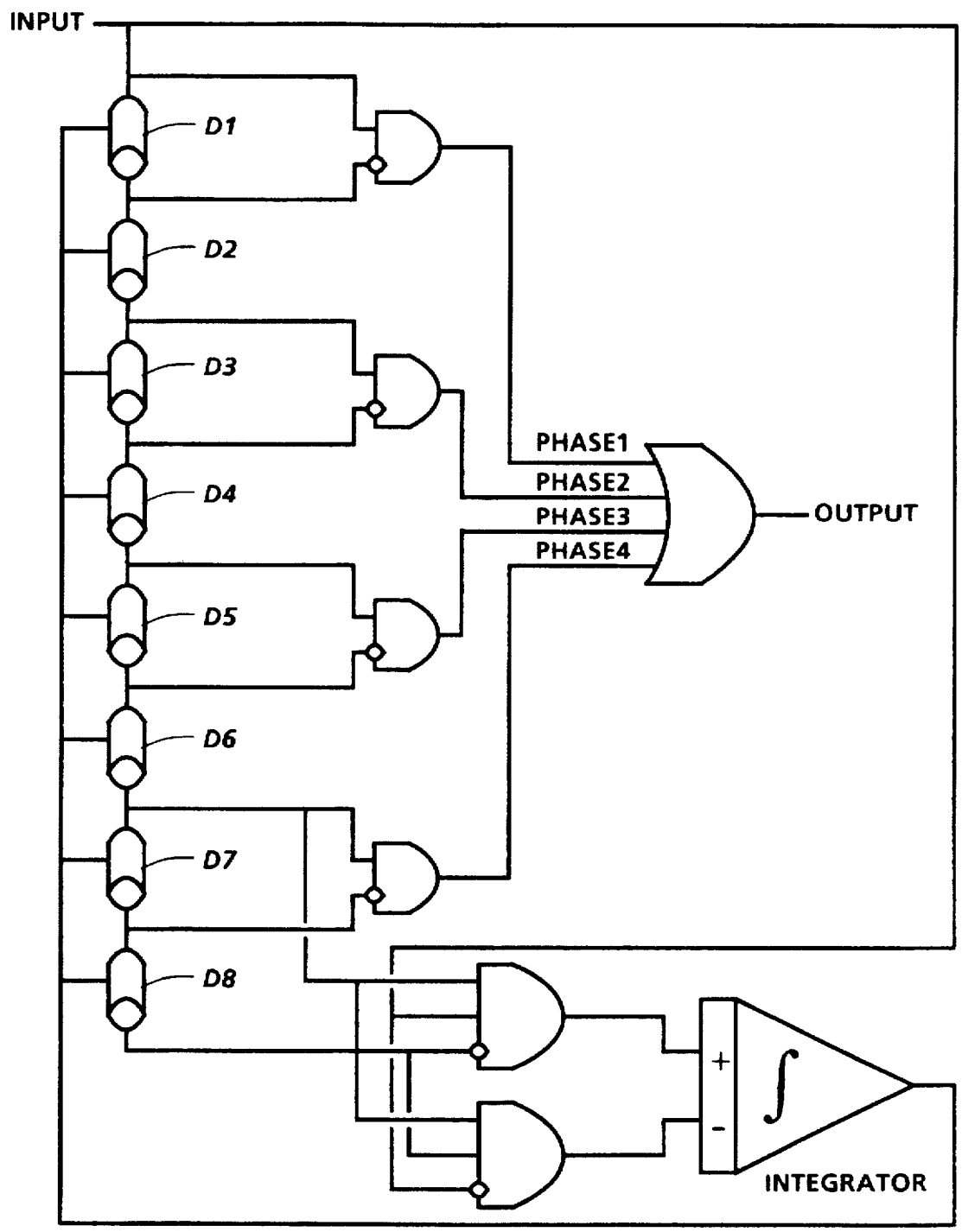
FIG. 1 is a block diagram of the clock multiplier.
Figure 2:
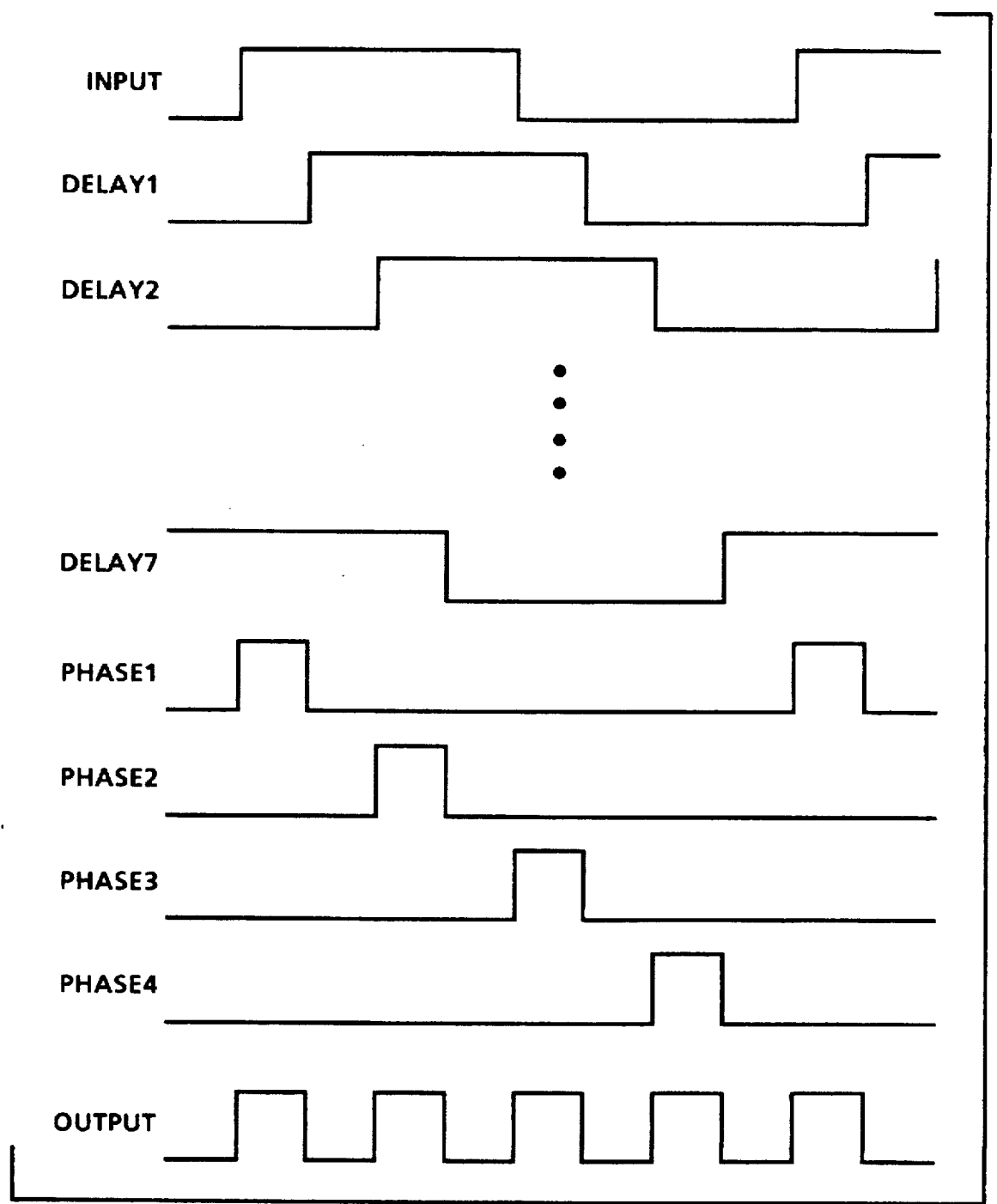
FIG. 2 is a graphical illustration of a clock multiplier waveforms in accordance to the present invention.

Referring to FIG. 1, the input clock signal is applied to a string of 8 delay lines, each having a delay of exactly ⅛ of the input period. At the leading edge of the input clock, the AND of the input signal and inverted output of the first delay line will be a pulse with a width of one delay unit. The output of the second AND gate, signal phase2, will also be a pulse with the same width, but it will be delayed by 2 delay units. And so on for phase3 and phase4. The OR of the four signals phase1, phase2, phase3 and phase4, will represent a signal with a frequency exactly four times the input frequency (see FIG. 2).

It is important that the delay time of each of the 8 delay lines is exactly ⅛ of the input frequency. If the delay is a little bit too little, there will be a gap between the fourth and fifth pulses of more than should be. Too big a delay will cause that gap to be too small. For proper imaging in high addressability mode this is not acceptable. The delay lines can be carefully adjusted in the present invention by using a common control to all delay lines. A potentiometer supplies a common voltage to all voltage controlled delay lines in the unit. This is not shown in FIG. 1. The alternative automatic tuning circuit is illustrated in FIG. 1.

Figure 3:
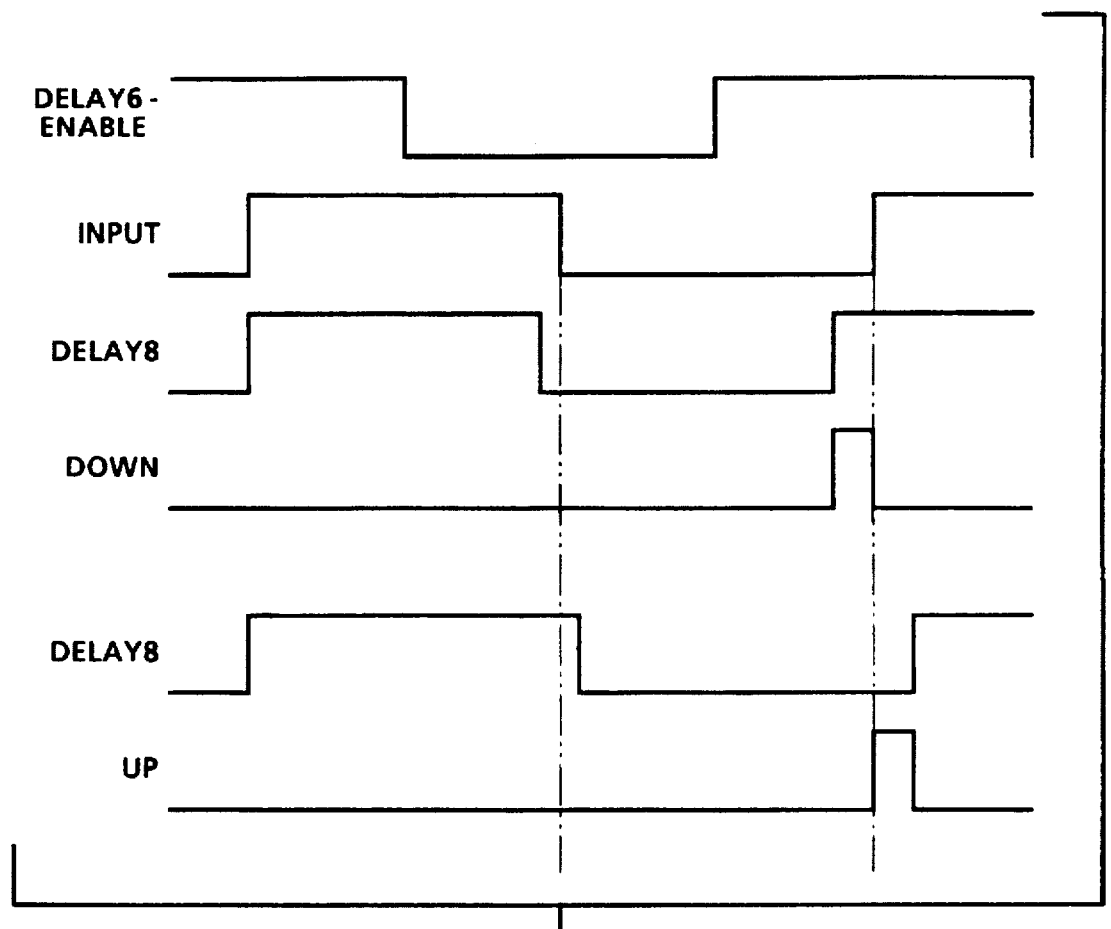
FIG. 3 is a graphical illustration of automatic tuning waveforms in accordance to the present invention.

Referring to FIG. 3, the automatic tuning of the delay lines is accomplished by deriving two tuning signals from the string of delay lines. Note that the rising edge of delay8 should coincide with the rising edge of the input signal, if the delays are exactly ⅛ of the clock period. If the delays are too small, the edge of delay8 will precede the edge of the input clock, and the AND gate will generate an 'up' pulse, as shown in FIG. 3. This pulse is applied to the integrator. The output voltage of the integrator will thus increase and cause the delaylines to be tuned for a longer delay. This continues until the delaylines are adjusted correctly. Conversely, if the delaylines are too slow, the signal 'down' will be generated, and as it is applied to the negative input of the integrator, it will have the opposite effect. When the delays are tuned exactly right, no 'up' or 'down' pulses will be generated, and the output of the integrator will be at a constant voltage. The signal delay6 is used as an enabling signal to the gates that generate the 'up' and 'down' signals in order to avoid spurious outputs at the down-going edge of the input clock. The same topology can be used to multiply by other integer factors N. A number 2N of delay lines are needed for the implementation. At some point, when N becomes large, this circuit clearly becomes impractical. The current implementation has 12 delay lines. A multiplication factor N of 2, 4 or 6 can be selected with an on-board selector switch.

Figure 4:
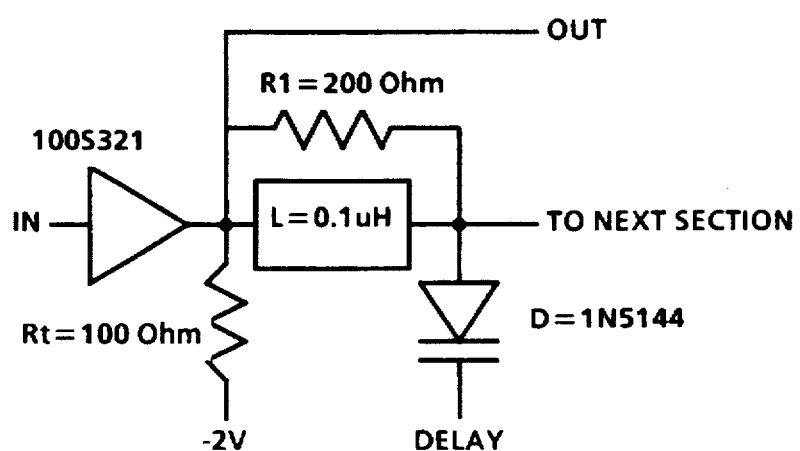
FIG. 4 is a variable delay line implementation in accordance to the present invention.
Figure 5:
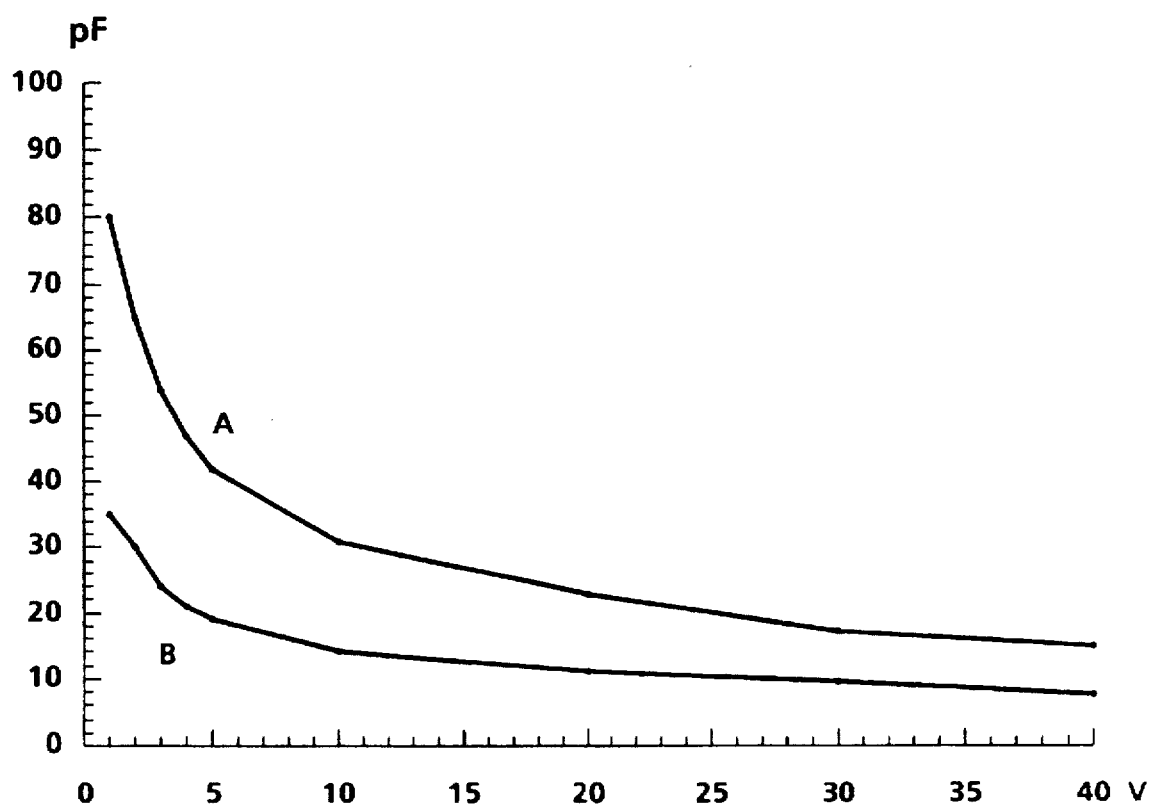
FIG. 5 is a graphical illustration of tuning diode capacitance; vs. voltage.
Figure 6:
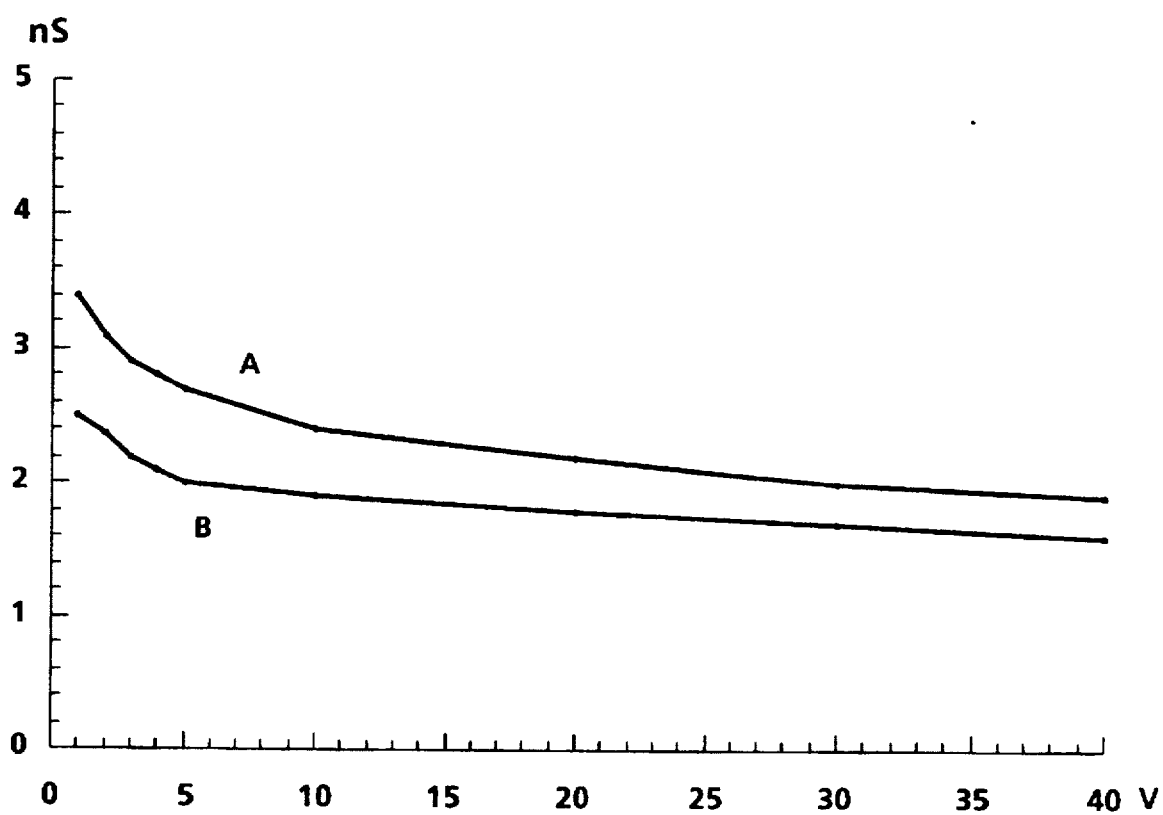
FIG. 6 is a graphical illustration tap delay vs. voltage.

The clock multiplier for the present invention can be built on a small circuit board that plugs directly to a 62 pin interface connector. The circuit works at fundamental frequency of up to 100 MHz and can be set for multiplication factor of 2, 4 or 6 with an on-board switch. The circuit is implemented with high speed logic, preferably a 100K ECL logic from Synergy Semiconductor and National Semiconductor is employed. A section of the variable delay line of the present invention is shown in FIG. 4. The basic delay element is the LC network. The inductor L is a standard 0.1 uH molded inductor. The capacitor is a tuning diode that is used as a variable capacitance capacitor. The delay of the circuit is changed by applying a voltage at the DELAY input of the circuit. This voltage will change the capacitance of the diode and thus the delay of the network. The capacitance as function of applied DC voltage of some tuning diodes is shown in FIG. 5. The resulting tap delays are shown in FIG. 6. These computed values assume a gate delay of 500 pS and parasitic capacitance of 5 pF. In the actual circuit there are 14 delay networks: They are preferably implemented with two 100S321 9-bit inverter chips from Synergy Semiconductor and National Semiconductor. The logic of FIG. 1 is implemented with an ECL ASPECT Programmable Array Logic chip from National Semiconductor. This chip takes as input the taps from the delay lines, and has outputs for the multiplied clock as well as the "up" and "down" signals for the automatic tuning integrator. The simple integrator is implemented with an op amp and capacitor. DIP switches on the board (not shown) allow for selecting multiplication ratios of 2, 4 or 6. Also selectable is "automatic tuning" or "manual" tuning. In manual tuning the integrator is disconnected and the tuning voltage is taken from a trimmer potentiometer on the circuit board. Power is taken from the +5V and −5V pins of the connector. An on-board AC-DC converter provides a +30 Volt voltage for the integrator and the tuning voltage.

In recapitulation, a clock multiplier circuit has been described that is useful for multiplying the frequency of a clock signal by an integer factor, like 4 or 6. In a typical application this multiplier is used for achieving high addressability printing on a laser printer. In order to print at a quarter pixel resolution, the frequency of the clock signal must be multiplied by four. It is important that at the beginning of the pulse train, as occurs on the leading edge of each scanline, the new clock locks in at once with the input clock from the printer. The clock multiplier has capabilities for multiplying the input clock by a factor of 4. Other factors, like 2, 6 or 8 can easily be achieved by expanding on the description. The circuit features automatic and instant locking to the input pulse train, as well as automatic tuning to the present clock frequency.

It is, therefore, apparent that there has been provided a clock multiplier circuit in accordance with the present invention, that fully satisfies the aims and advantages hereinbefore set forth. While this invention has been described in conjunction with a specific embodiment thereof, it is evident that many alternatives, modifications, and variations will be apparent to those skilled in the art. Accordingly, it is intended to embrace all such alternatives, modifications and variations that fall within the spirit and broad scope of the appended claims.

What is claimed is:

1. A printing system for printing an image on a substrate, the image being represented by a set of words with each word being modulated so as to produce a single bit stream, each of the words including M bits, comprising:

a tunable multi-phase clock generator, responsive to a clock signal with a first clock rate, for producing N phase signals;

a data serializer, communicating with said multi-phase clock generator, for receiving the N phase signals and the word set, said data serializer processing each word of the word set, with the N phase signals, to produce the single bit stream, the single bit stream being outputted at a second clock rate with the second clock rate being greater than the first clock rate;

a tuning circuit, responsive to said tunable multi-phase clock generator, for controlling tuning of said tunable multi-phase clock generator so that said single bit stream being outputted with said second clock rate is outputted substantially instantaneously with reception of said said clock signal; and a print engine communicating with said data serializer and receiving the single bit stream, said print engine printing the image on the substrate.

2. The printing system of claim 1, wherein said tunable multi-phase clock generator includes a plurality of delay line circuits.

3. The printing system of claim 2, wherein each of said plurality of delay line circuits is connected in a string.

4. The printing system of claim 3, wherein said string includes eight delay lines circuits and wherein each of said eight delay lines has a delay of ⅛ of the period of said clock signal.

5. The printing system of claim 3, wherein said string further includes means for producing a tuning signal.

6. A printing system for printing an image on a substrate, the image being represented by a set of words with each word being modulated so as to produce a single bit stream, each of the words including M bits, comprising:

- a tunable multi-phase clock generator, responsive to a clock signal with a first clock rate, for producing N phase signals, said tunable multi-phase clock generator includes a plurality of delay line circuits connected in a string having means for producing a tuning signal;
- a data serializer, communicating with said multi-phase clock generator, for receiving the N phase signals and the word set, said data serializer processing each word of the word set, with the N phase signals, to produce the single bit stream, the single bit stream being outputted at a second clock rate with the second clock rate being greater than the first clock rate;
- a tuning circuit, responsive to said tunable multi-phase clock generator, for controlling tuning of said tunable multi-phase clock generator so that said single bit stream being outputted with said second clock rate is outputted substantially instantaneously with reception of said clock signal, said tuning circuit includes a integrator, communicating with said string, for receiving said tuning signal and generating a feed back signal to adjust said string; and
- a print engine communicating with said data serializer and receiving the single bit stream, said print engine printing the image on the substrate.

7. A method for printing an image on a substrate, the image being represented by a set of words with each word being modulated so as to produce a single bit stream, each of the words including M bits, comprising the step of:

- producing N phase signals with a tunable multi-phase clock generator, responsive to a clock signal with a first clock rate;
- receiving the N phase signals and the word set;
- processing each word of the word set, with the N phase signals, to produce the single bit stream, the single bit stream being outputted at a second clock rate with the second clock rate being greater than the first clock rate;
- tuning said tunable multi-phase clock generator so that said single bit stream being outputted with said second clock rate is outputted substantially instantaneously with reception of said clock signal;
- receiving the single bit stream; and printing the image on the substrate.

* * * * *